Patented Oct. 26, 1937

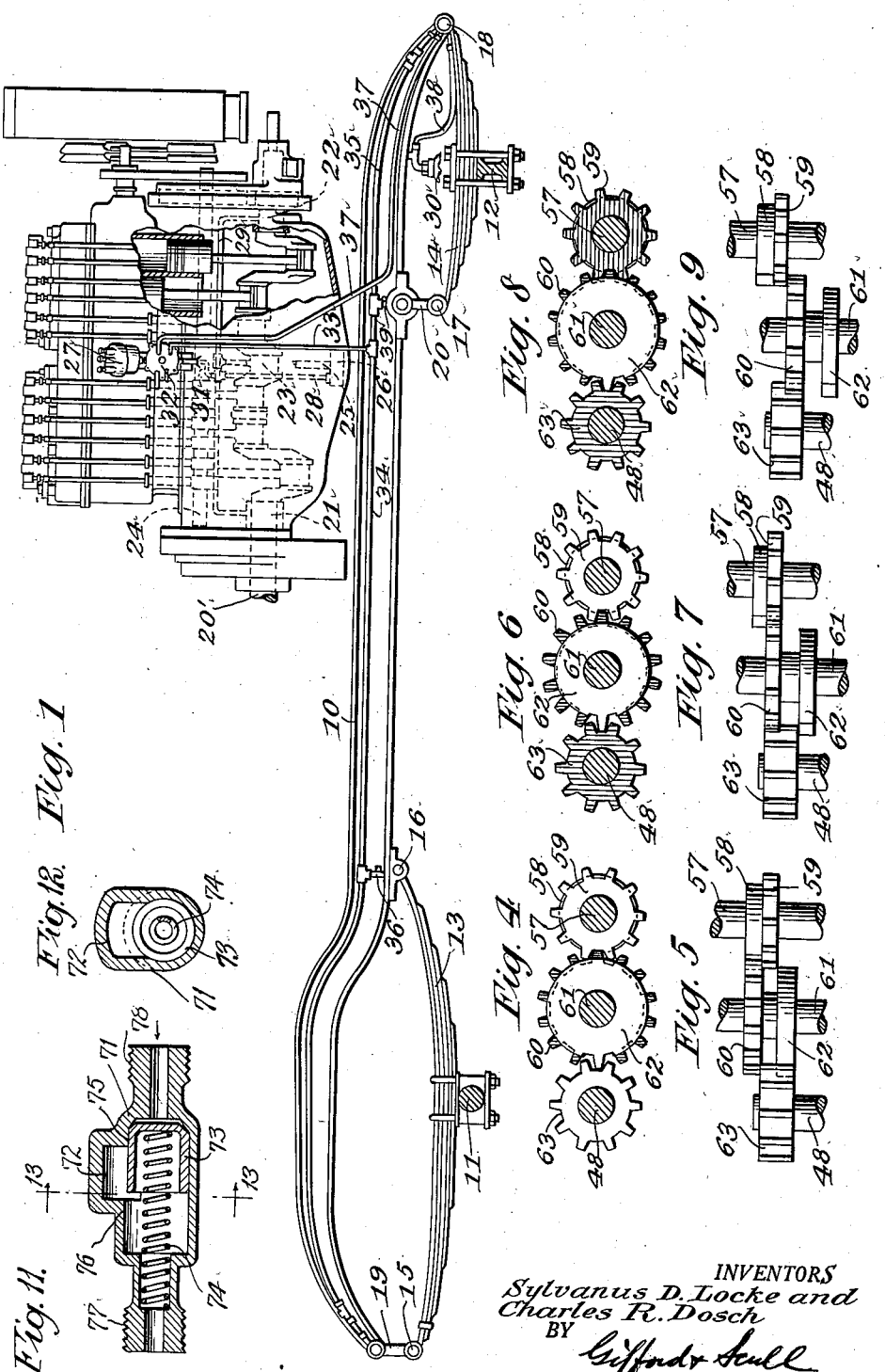

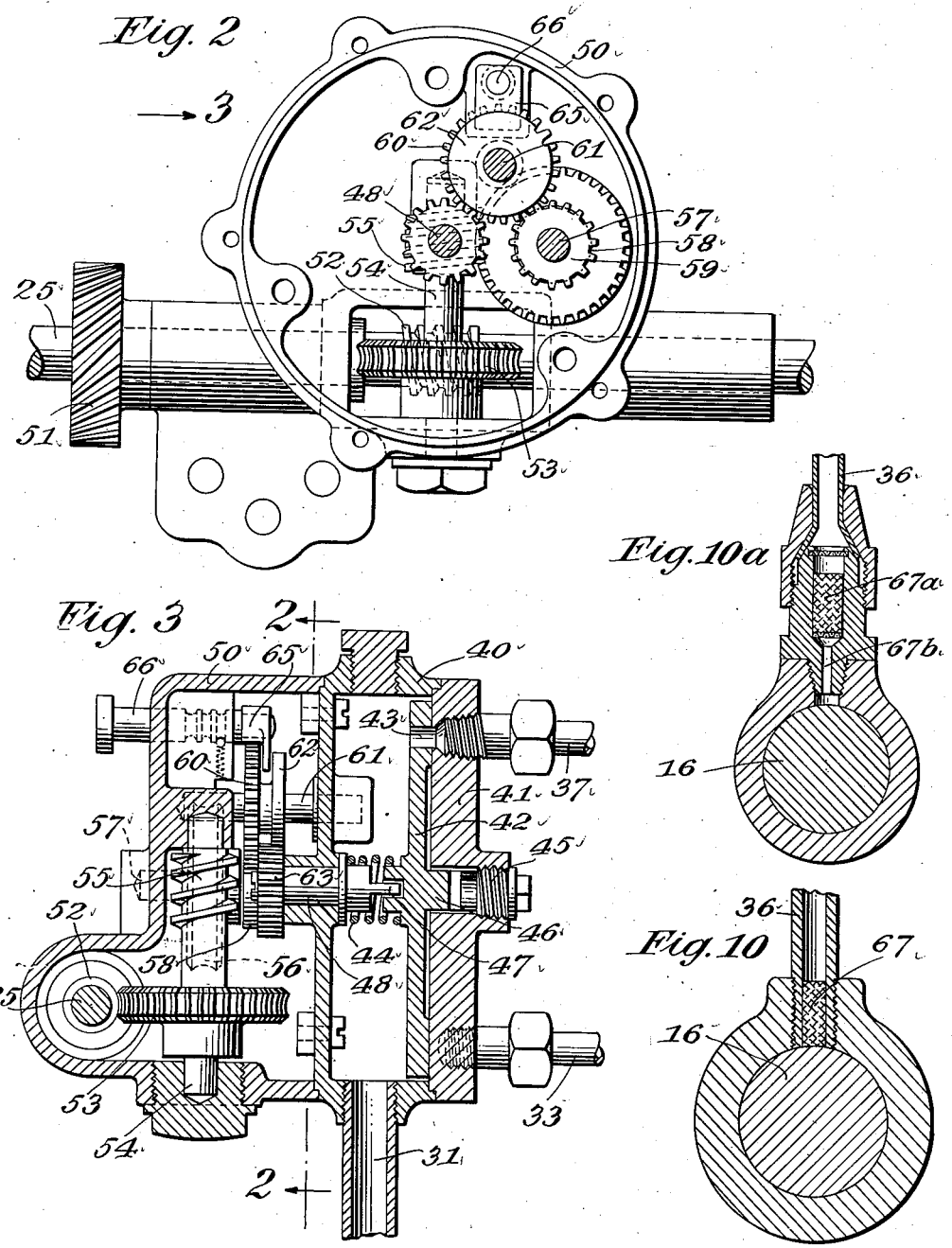

2,097,126

UNITED STATES PATENT OFFICE 2,097,126

LUBRICATING APPARATUS

Sylvanus D. Locke, Bridgeport, and Charles R. Dosch, Stratford, Conn., assignors, by mesne assignments, to Stewart-Warner Corporation, Chicago, Ill., a corporation of Virginia Application July 31, 1925, Serial No. 47,284

24 Claims. (Cl. 184—7)

This application is a continuation in part of our application for patent, Serial No. 411,533, filed September 20, 1920, now Patent No. 1,847,434, issued March 1, 1932.

Our present invention relates to a lubricating apparatus for mechanism, and more particularly for motor vehicles.

One of the objects of our present invention is to provide an arrangement by which all parts of a vehicle requiring lubrication may be automatically lubricated in accordance with the need of each bearing. Another object of our invention is to provide a means by which a bearing may be lubricated automatically and intermittently by a predetermined amount of lubricant supplied at predetermined intervals.

Another object of our invention is to provide a means by which a quantity of oil may be supplied to a branched pipe, the branches of which lead to different bearings, and by which each bearing will obtain its required amount of lubricant from the common supply pipe.

With these and other objects in view our invention consists of the construction and arrangement of parts hereinafter described and more fully pointed out in the appended claims.

In the drawings, Fig. 1 is a side elevation of a part of an automobile, which we have adopted to illustrate one form of our invention, showing in more or less diagrammatic form a part of the chassis and of the engine, the engine being shown above its normal position for the sake of clearness; Fig. 2 is an elevation of an illustrative form of distributor valve which may be used in carrying out our invention, Fig. 2 being a section of Fig. 3 on the line 2—2; Fig. 3 is a vertical central section of Fig. 2 looking in the direction of the arrow; Figs. 4 and 5 are, respectively, elevation and plan of the combination of intermittently and continuously moving gearing shown in Figs. 2 and 3, with the gearing arranged as for the normal operation of our device; Figs. 6 and 7 correspond to Figs. 4 and 5, with the intermittent gearing thrown out of operation, and continuous gearing substituted therefor; Figs. 8 and 9 correspond to Figs. 4 and 5, but with the gearing thrown entirely out of operation; Fig. 10 is an enlarged sectional view detailing a flow retardant in each branch of the branched pipe; Fig. 10a is a similar view of a variant form of flow retardant; Fig. 11 is a longitudinal section showing one illustrative form of measuring device; and Fig. 12 is a vertical section on the line 13—13 of Fig. 11.

In the drawings, corresponding parts have corresponding characters.

As an illustration of one form in which our invention may be applied, we have shown it in connection with an automobile of a known type, in which 10 is a side bar or member shown as having a channel section, as is usual, and 11 and 12 are, respectively, the rear and front axles or parts which ultimately carry the weight of the vehicle to the wheels. Between the parts 11 and 12 and the side member 10 are the usual springs 13, 14, connected by shackle bolts 15, 16, 17, and 18, all as usual, the shackles 15 and 17 being connected with pins attached to the frame 10 by the links 19 and 20. On the frame 10 is carried a gas engine of any of the well known types, and which generally is suspended on the side frames, so that the center line of its crank shaft extends just above the axle 12. In Fig. 1, however, in order to clarify the disclosure, the engine is shown above its normal position. In the form of the engine which we have adapted for purposes of illustration, 20' is a crank shaft extending along the engine base and having rear bearing 21, front bearing 22, and middle bearing 23. Driven through suitable gearing is a cam or timing shaft 24, which, in the form illustrated, is provided at its central portion with a spiral gear (not shown) which drives a vertical shaft 25 (broken away for sake of clearness) through a spiral gear 51 (Fig. 2) thereon. At the lower end of this vertical shaft is a rotary oil pump 26, and at its upper end is the usual ignition timing device 27.

All of the parts thus far described are old in the art and further description will be unnecessary to a correct understanding of our invention.

The shackle bolts connecting the springs 13, 14 with the side frames, as well as other bearings, such as the steering knuckles and links, valve rocker arms and the like, require a relatively small amount of lubricant at relatively long intervals, since the motion of the parts carried thereon is comparatively small. Nevertheless, some lubrication is required, and heretofore, it has been the usual practice to lubricate each of these bearings separately by applying the lubricant directly to them whenever the user of the machine deemed it necessary. This non-automatic lubrication results in frequent neglect, and is, in any event, a task avoided, if possible, by the user of the vehicle.

It has been the usual practice to flood the bearings of the crank shaft and sometimes of other parts of the engine with lubricant carried in the base of the engine, the pump 26 supplying a continuous stream through a pipe 28 to a horizontal branched pipe 29, and thence to the continuously running crank shaft bearings. The surplus oil falls back to the bottom of the crank casing from which it is pumped up again by the pump 26. As a preferred means for carrying out our invention, we use the pump 26 as a source of supply for the lubrication of the shackle bolts and for any other parts of the vehicle which require only a relatively small amount of lubrication, such as the steering knuckle, one of which is illustrated at 30, the rocker arms for overhead valve engines and the like. It is obvious, however, that since the pump 26 is supplying a continuous stream of oil to the motor bearings, an apparatus must be provided to modify this supply so as to adapt it to lubricate the parts just referred to. As an illustrative form of our invention, we provide a pipe 31 in continuation of the pipe 28 and extending through the motor casing to a valve mechanism, which we designate generally in Fig. 1 by the character 32, which valve mechanism, as will be more fully explained hereinafter, is operated, in the illustrative form of our invention, by the vertical shaft 25. From the valve mechanism 32 leads one or more pipes which connect through suitable branches with the several bearings to be lubricated. For instance, a pipe 33 extends to horizontal pipes 34 and 35 spported in the side frame 10. The pipe 34 through pipe 36 communicates with the shackle bolt 16 and directly with the pin supporting the member 19 through which the lubricant may be carried directly to the shackle bolt 15. Similarly, pipe 35 leads to the shackle bolt 18. A second pipe 37 also extends from the valve 32 to an arrangement at the front end of the frame 10 (not necessary to be described herein), and thence a pipe 38 extends to the steering knuckle 30. A branch 39 connects the pipe 35 with the supporting pin over the link 20 and thence the lubricant will flow to the shackle bolt 17. Similar pipes will connect the valve 32 with any other bearings it is desired to lubricate.

In the form illustrated, we arrange the valve 32 so that the several lubricant feed pipes will be connected to the oil supply pump at definite intervals, which ordinarily will be relatively widely spaced apart in time. One form of such valve mechanism, which may be used in connection with our invention, is shown in enlarged view in Figs. 2 and 3, in which 40 is a valve casing having a cover 41 through which extend the pipes 33 and 37, and as many more as may be desired to supply different bearings to be lubricated. In the casing 40 is a valve plate 42 having one or more openings 43 arranged to pass over the entrances to the pipes 33, 37 and held against the cover 41 by a spring 44. A screw plug 45 is arranged so that by screwing it inward, it will press against the pivot 46 of the plate 42 and lift the plate from its contact with the cover 41 when it is desired to flood the several bearings to be lubricated, or to clean the pipes or the like.

The valve plate 42 is rotated by a tongue 47 engaging in a groove in the valve plate 42 and carried on the end of a shaft 48 supported in a bearing in the casing 40. The pipe 31 extends into one side of the chamber in the casing 40 to supply the lubricant thereto from the pump 26, and it will be seen that when the opening 43 registers with any one of the lubricating pipe openings, the pressure from the pump 26 will be transmitted, through the pipe 31 and the casing 40, into the pipe for so long as the opening 43 is opposite the pipe opening. Preferably, as in the form illustrated, the plate 42 is rotated, by the engine, so that the oil supply to the several bearings will be governed by the approximate distance traveled. At the rear of the casing 40 is a casing 50 which carries suitable gearing to connect the engine with the valve plate 42. On the shaft 25 is a spiral gear 51 engaging with a corresponding gear on the cam shaft 24 of the engine, this shaft 25 being carried through suitable bearings in the casing 50 and extending to the ignition timing device in the form illustrated in the drawings. On the shaft 25 is a worm 52 engaging with a worm gear 53 carried by a vertical shaft 54 supported in the casing 50. A second worm 55 is mounted on the shaft 54 and meshes with a worm gear 56 on a horizontal shaft 57. While these worms and gears considerably reduce the speed of the shaft 57 in comparison with the speed of the engine shaft, yet it will be obvious to those skilled in the art that if this gearing were directly connected to the plate 42, the several bearings would be lubricated at too frequent intervals. Preferably, therefore, we introduce between the shaft 57 and the plate 42 broken or intermittent gearing, which will still further considerably increase the ratio between the turns of the engine and of the plate 42 and yet which will cause the plate 42 to turn with a relatively high velocity when the opening 43 is passing the end of one of the lubricating pipes, so as not to prolong unduly the time during which pressure is applied from the valve chamber to the pipe. As an illustrative form of such broken gearing, we have shown a single toothed gear 58 attached to shaft 57 and beside it a spur gear 59. The single toothed gear 58 engages with the tooth of the spur gear 60 on an idler shaft 61, the hub of the gear 60 having attached to it a single toothed gear 62 which engages with a wide faced gear 63 connected to the shaft 48 through which the plate 42 is driven by the tongue 47. The relative arrangement of these gears is best shown in Figs. 4 and 5 where the shafts have been shown as in the same plane, although in the form illustrated, the shaft 61 is actually at one side of the plane of the shafts 48 and 57. As a convenient means of locking gears 60 and 63 against rotation, except when the single teeth of gears 58 and 62 are engaging therewith, the body portions of gears 58 and 62 may be provided with circular portions arranged to contact with the extreme edges of the teeth on gears 60 and 63, as shown in Figs. 4, 6, and 8.

With the shaft 25 continuously rotating, the shaft 57 is also continuously rotated, but at a relatively low rate of speed by reason of the worm and worm gears between the two shafts. The shaft 48 and with it the plate 42 is given an intermittent or step by step motion at prolonged intervals and only when the single toothed gear 62 engages with the gear 63. This engagement does not occur, of course, until the single toothed gear 58 has made a sufficient number of turns to rotate the gear 60 once. By proper proportion of the parts, however, the opening 43 may be made to pass entirely across the entrance to one of the oil pipes during the time of the engagement of the single tooth of the gear 62 with the gear 63, and since, at that time, the single tooth of gear 58 is also engaged with the gear 60, there is, for that interval only, a substantially continuous gear connection between the plate 42 and the engine shaft. Thus the time of opening of the valve 43 may be relatively short and yet the valve plate 42 be so moving that the total time for it to make one rotation may be exceedingly long. Our combination of the continuous and intermittent reduction gearing, therefore, does not merely reduce the speed of the valve plate 42 in relation to the engine shaft, but it gives the valve plate 42 a motion which is peculiarly useful in carrying out the illustrated form of our invention.

The gears 60, 62 are freely rotatable on the shaft 61 and may also be slid longitudinally thereof from the position shown in Fig. 5 to those shown in Figs. 7 to 9, this sliding being accomplished by a tongue member 65 on the end of a longitudinally movable stud 66 extending through the casing 50, this stud being held in any one of three adjusted positions by means of a spring-held ball ratchet of any well known type, the ball engaging in suitable grooves in the stud 66. In Figs. 3, 4, and 5, the gearing is shown in the position in which it will be during the normal operation of our device, but if it is required to cut out the operation of the intermittent gearing, as may be desired under some circumstances, the stud 66 is moved to its central position, thus carrying the gearing to the position shown in Fig. 7, so that the plate 42 will be continuously rotated, thus greatly shortening the intervals between the lubrications of the bearings. A further motion of the stud 66 will move the gear to the position shown in Fig. 9, which completely disconnects the plate 42 from the engine shaft in the event that it is desired to suspend the automatic lubrication of the bearings.

At each rotation of the valve plate 42 and during the time the opening 43 registers with the end of the pipe 33, the pump 26 will be directly connected to the pipes 34 and 35 through the common supply pipe 33, and oil under pressure will, therefore, be forced or attempted to be forced into the pipes 34, 35 and from them into the bearings connected therewith. Similarly, when opening 43 registers with the end of pipe 37, oil will be forced to the bearings to which it leads. In the form of our invention illustrated, the flooding of the bearings is prevented by providing a flow retardant in each branch, such a retardant being illustrated in Figs. 10 and 10a, in which a plug, as a cotton wicking 67, is inserted in the pipe 36 leading to the bearing 16. In Fig. 10a, the plug 67a is spaced from the bearing, a port 67b leading from the plug to the bearing. It will be understood that each bearing is supplied with a flow retardant.

In some instances we have found it desirable to place a measuring valve in each branch adjacent the flow retardant and on the pump side thereof. One form of such a valve we have illustrated in the arrangement shown in Figs. 11 and 12 in which a body member 71, which may be connected in the line of piping preferably adjacent the bearing to be lubricated, has formed therein a laterally disposed chamber 72. Within the central cavity of the member 71 is a sliding valve 73 normally held in the position shown in Fig. 11 by a spring 74. The valve 73 is so arranged in relation to the chamber 72 and its connection with the central cavity of the body member 71, that the valve 73 in effect works between two valve seats, one of which may be designated as a portion 75 of the member 71 and the other as a portion 76 of the member 71. It will be seen that, in the position shown in the drawings, the valve 73 is seated against valve seat 75, so as to close the pipe against the flow of fluid in the direction of the arrow in Fig. 11 until the pressure of such fluid is great enough to overcome the pressure of the spring 74. When the valve is in this position, it is above the seat 76 so as to connect the chamber 72 with the central cavity. This would permit any fluid in the chamber 72 to flow out into the central cavity and finally out of the end 77. When the valve 73 is moved to the left of Fig. 11, however, so that it seats itself against the seat 76 by sliding longitudinally in the central cavity, the valve illustrated is long enough to first cut off the chamber 72 from all connection with the central cavity and finally, by the further motion to the left of the valve 73, to open the chamber 72 to the end 78 of the valve body, thus permitting fluid to flow from the end 78 into the cavity 72.

With the parts arranged as shown in Figs. 1 to 10a of the drawings, and the engine in motion, lubricant will be supplied continuously to some of the bearings, and particularly to the shaft bearings of the engine. The gearing connected to the valve 32 will also be moved, but by reason of its character will rotate the valve plate 42 relatively slowly, so as to open the valve 32 only after a predetermined number of turns of the engine. If the machine has been in use previously, the several pipes will be filled with lubricant, none of which can pass to the respective bearings, however, because of the presence of a flow retardant 67 adjacent each bearing. When, in the course of the turning of the plate 42, one of the openings 43 registers with the end of one of the pipes, then the pump pressure is transmitted to the lubricant in the pipes and forces some of the lubricant past each retardant, in accordance with the amount of resistance which has been provided in each retardant and which will be greater or less, according to the quantity of oil each bearing is to receive.

When the valve 71 is used in addition to the flow retardant 67, the registration of the opening 43 with one end of one of the pipes leading to the chassis bearings will result in the pump pressure being transmitted to the lubricant in the pipe thereby forcing the movable valve 73 to the left as shown in Fig. 11. As the movable valve 73 travels toward the left in said figure, it first cooperates with the seat 76 to cut off effective communication between the chamber 72 and the outlet end 77 and thereafter the right-hand end of the movable valve 73 clears the seat 75 and permits oil to flow freely into the chamber 72 in which the oil compresses the air into the upper part thereof until the pressure of the compressed air is substantially equal to the pump pressure. It will thus be obvious that the capacity of this chamber can be varied by varying the dimensions thereof. During the leftward stroke of the movable valve 73, this valve will tend to force into the bearing part of the oil which lies between it and the bearing. If the conduit connecting the outlet end 77 of the valve 71 with the bearing is partially filled with air, leftward movement of the movable valve 73 will serve to compress this air and in some instances where this connecting conduit is full or substantially full of oil, the resistance of the flow retardant may be sufficient to prevent full leftward movement of the movable valve 73.

After the plate 42 has cut off communication between the pipe and the engine lubricating system, the spring 74 slowly returns the movable valve 73 to the position shown in Fig. 11. As this valve moves toward the right in said figure, it bypasses sufficient lubricant from in front thereof to permit its return to initial position. The slight clearance between this movable valve and its seats which permits this by-passing is only the normal clearance which is usually provided in mechanical devices of the size and type of this valve and is not sufficiently large to permit any leakage of lubricant past the movable valve during the short period when the port 43 connects the valve with the engine oil pump.

While we prefer to use the lubricant in the engine base as a source of supply, it will be understood that a separate reservoir may be used for the supply to the intermittently lubricated bearings. It will also be understood that the form of the distributor valve may be varied within wide limits and may be of any of the known types other than the rotary valve which we have chosen for purposes of illustration. It will also be understood that, if desired, individual pipes may be run from the distributor valve to each bearing, but preferably we provide a branched system to economize in tubing.

While we have illustrated and described our invention as it would be applied to a motor vehicle, it will be understood that it may be applied to other kinds of machines, and furthermore that some parts of our invention may be used independently of other parts thereof.

We claim:

1. In a motor vehicle, in combination, chassis bearings, an installation for supplying lubricant to said bearings, said installation including a force pump delivering at a level higher than said bearings, a piping system normally maintained partly filled with oil and supplied from said pump intermittently with small charges of oil and having outlet branches leading to various bearings, a device in each of said branches to limit the flow therethrough, said branches normally oil-sealed to prevent the entry of air in reverse direction therethrough, said piping system being also closed from the external air ahead of said branches, so that the branches will emit oil to the bearings after pump operation, until the state of equilibrium of the pipe contents is restored.

2. A chassis lubricating system comprising piping having an elevated inlet and including outlets leading to the bearings and restricting the free flow of fluid therethrough in either direction and normally maintaining a quantity of oil in the piping, a supply installation at said inlet including a force pump to introduce small charges of lubricant into the piping and including an oil-sealed inlet valve closed during the intervals between pump operations, said outlets adapted to emit lubricant therethrough consequent upon forcing small charges of oil into the head of the pipe line until equilibrium in the system is restored.

3. In a motor vehicle, in combination, chassis bearings, an installation for supplying lubricant to said bearings, said installation including a force pump having a fixed cylinder delivering at a level higher than said bearings, a piping system normally maintained partly filled with oil and supplied from said pump intermittently with small charges of oil and having outlet branches leading to the various bearings, a device in each of said branches to limit the flow therethrough, said branches normally oil sealed to prevent the entry of air in reverse direction therethrough, said piping system being also closed from the external air ahead of said branches, so that the branches will emit oil to the bearings after pump operation, until the state of equilibrium of the pipe contents is restored.

4. In a motor vehicle, a chassis lubricating system comprising piping having an elevated inlet and including outlets leading to the bearings and restricting the free flow of fluid therethrough in either direction and normally maintaining a quantity of oil in the piping, a supply installation at said inlet including a force pump operable incidental to the operation of the vehicle to introduce small charges of lubricant into the piping and including an oil sealed inlet valve closed during the intervals between pump operations, said outlets adapted to emit lubricant therethrough consequent upon forcing small charges of oil into the head of the pipe line until equilibrium in the system is restored.

5. A chassis lubricating system comprising piping having an elevated inlet and including outlets leading to the bearings and restricting the free flow of fluid therethrough in either direction and normally maintaining a quantity of oil in the piping, a supply installation at said inlet including a force pump operated by the engine of the vehicle to introduce small charges of lubricant into the piping and including an oil sealed inlet valve closed during the intervals between pump operations, said outlets including flow resisting plugs inserted therein and adapted to emit lubricant therethrough consequent upon forcing small charges of oil into the head of the piping line, until equilibrium in the system is restored.

6. In a motor vehicle, in combination, chassis bearings, an installation for supplying lubricant to said bearings, said installation including a force pump delivering at a level higher than said bearings, a piping system normally having a body of oil therein and supplied from said pump intermittently with small charges of oil and having outlet branches leading to various bearings, a flow retardant in each of said branches to limit the flow therethrough, said branches automatically sealed by the action of the oil to prevent the entry of air in reverse direction therethrough, said piping system being also closed from the external air ahead of said branches so that the branches will emit oil to the bearings after pump operation, until the state of equilibrium of the pipe contents is restored.

7. In a motor vehicle, in combination, chassis bearings, an installation for supplying lubricant to said bearings, said installation including a reservoir having a force pump submerged therein for delivering at a level higher than said bearings, a piping system normally maintained partly filled with oil and supplied from said pump intermittently with small charges of oil and having outlet branches leading to various bearings, a flow retardant in each of said branches to limit the flow therethrough, said flow retardant comprising an inadjustable plug of cross-section no greater than that of said piping, said branches being automatically sealed by the action of the oil to prevent the entry of air in reverse direction therethrough, a valve for closing said piping system from the external air ahead of said branches, so that the branches will emit oil to the bearings after pump operation, until the state of equilibrium of the pipe contents is restored.

8. A central chassis lubricating installation including a pipe line having an inlet closed against venting, and having branches with outlets feeding the bearings and connected in multiple, means closing said branches against venting, said antiventing means normally open to the pipe line from which they are supplied and having therein lubricant passageways so small as to prevent concurrent flow of lubricant and air therethrough in opposite directions, said passageways adapted to emit lubricant therethrough consequent upon forcing small charges of lubricant into the head of the pipe line, until equilibrium in the system is restored.

9. A central chassis lubricating installation including a reservoir, a power-operated pump submerged therein, a pipe line having an inlet closed against venting, and having branches with outlets feeding the bearings and connected in multiple, means closing said branches against venting, said anti-venting means normally open to the pipe line from which they are supplied and having therein lubricant passageways so small as to prevent concurrent flow of lubricant and air therethrough in opposite directions, said passageways adapted to emit lubricant therethrough consequent upon forcing small charges of lubricant into the head of the pipe line, until equilibrium in the system is restored.

10. A central chassis lubricating installation including a pipe line having outlets mounted near the bearings and connected in multiple, a pump connected to the inlet of the piping system, means reclosing said inlet against venting, means closing said outlets against venting, said latter anti-venting means being located at the bearing ends of the branches and being normally open to the pipe line from which they are supplied and having therein lubricant passageways so small as to prevent the concurrent flow of lubricant from the branches, and air therethrough in opposite directions, said passageways adapted to emit lubricant therethrough consequent upon forcing of small charges of lubricant from the pump into the head of the pipe line, until equilibrium in the system is restored.

11. A chassis lubricating system comprising piping having an elevated inlet and including outlets leading to the bearings and restricting the free flow of fluid therethrough in either direction and normally maintaining a quantity of oil in the piping, a supply installation at said inlet including a force pump operated by the engine of the vehicle to inject at intervals varying with engine operation small charges of lubricant into the piping and including an oil-sealed inlet valve closed during the intervals between pump injections, said outlets adapted to emit lubricant therethrough consequent upon forcing small charges of oil into the head of the pipe line until equilibrium in the system is restored.

12. In a motor vehicle, in combination, chassis bearings, an installation for supplying lubricant to said bearings, said installation including a force pump having a fixed cylinder delivering at a level higher than said bearings, said pump being operated from the engine of the vehicle, a piping system normally maintained substantially filled with oil and supplied from said pump intermittently with small charges of oil and having outlet branches leading to the various bearings, means in each of said branches to limit the flow therethrough, said branches normally and automatically sealed by the action of the oil in said system to prevent the entry of air in reverse direction therethrough, said piping system being also closed from the external air ahead of said branches, so that the branches will emit oil to the bearings after pump operation, until the state of equilibrium of the pipe contents is restored.

13. In a motor vehicle, in combination, chassis bearings, an installation for supplying lubricant to said bearings, said installation including a reservoir, a force pump submerged therein and delivering at a level higher than said bearings, said pump being operated from the engine of the vehicle, a piping system normally maintained substantially filled with oil and supplied from said pump intermittently with small charges of oil and having outlet branches leading to the various bearings, means in each of said branches comprising a small plug to limit the flow therethrough, said branches normally and automatically sealed by the action of the oil in said system to prevent the entry of air in reverse direction therethrough, and a valve closing said piping system from the external air ahead of said branches, so that the branches will emit oil to the bearings after pump operation, until the state of equilibrium of the pipe contents is restored.

14. An installation of the character described for association with a motor vehicle having an engine, said installation comprising the combination of a distributing system having restricted drip plug outlets, a reservoir, means including a pump operated incidental to the operation of said engine and functioning at frequent intervals to force small quantities of lubricant from said reservoir into said system, said installation having resiliency for continued emission through the drip plugs after the operating means has completed its work.

15. A central chassis lubricating installation for a motor vehicle having an engine, including a distributing system having drip plug outlets, and means functioning incidental to the normal operation of said engine to resiliently apply and sustain pressure upon the lubricant in the system for substantially continuous emission through the drip plugs during vehicle operation.

16. In an automobile having an engine and numerous chassis bearings requiring lubrication, an oil reservoir, connections between the reservoir and said bearings, metering means of metal in said connections to properly apportion oil among the several chassis bearings, textile fiber plugs in series with said metering means, and means driven from the engine to initiate the flow of oil through said connections, plugs and metering means to said bearings.

17. In a centralized lubricating system for the lubrication of the chassis bearings of an automotive vehicle having a motor for propelling the same, the combination of an oil reservoir, a pump deriving its supply of oil from said reservoir, and adapted to discharge oil under pressure, a branched conduit system supplied with oil by the discharge of said pump, lubricant flow metering devices positioned adjacent the ends of the branches of said conduit system for proportioning the discharge of said pump among a plurality of said chassis bearings in accordance with their predetermined requirements, a plug of textile fiber in series with each metering means, and means controlled by the said engine of said vehicle for intermittently interrupting the discharge of oil into said conduit system by said pump.

18. In an automobile having engine bearings and chassis bearings, a lubricating system for said bearings comprising a lubricant reservoir, a pump having its inlet near the bottom of said reservoir and deriving its power from the engine of the automobile, connections from said pump to said bearings, said connections including branches, metallic metering means in each branch, said metering means including a check valve, a filter plug of textile fibers in each branch, and a connection between said pump and the automobile engine whereby said pump is operated incidental to the operation of said engine.

19. In an automobile having chassis bearings requiring lubrication and an engine, a centralized lubricating system comprising a pumping mechanism deriving power from said engine, a branched conduit system leading to a plurality of chassis bearings having predetermined diverse lubrication requirements, metering means for apportioning the lubricant supplied by said pump mechanism among said chassis bearings in predetermined amounts corresponding to their requirements, filter means adjacent said metering means, said pumping mechanism being operated to inject charges of oil into said conduit system intermittently, and said conduit system having resiliency for temporarily storing part of the lubricant injected, and supplying it to the bearings in a slow, substantially continuous flow, and valve mechanism in said metering means for preventing the draining of the lubricating system when the automobile is not in operation.

20. In an automobile having power mechanism for propelling the same and a plurality of bearings having different lubrication requirements, a centralized lubricating system comprising an oil reservoir, a power driven pump supplied therefrom, a branched conduit system connecting said pump with said bearings, power operated control means coordinated with said pump to regulate the supply of lubricant to said conduit system, filter means comprising fiber plugs in the branches of the conduit system, and metering means in said branches to apportion the lubricant among the branches according to their individual requirements.

21. In a lubricating system for the chassis bearings of an automobile, a pump having a casing, a member movable in said casing to discharge oil therefrom under pressure, a reservoir connected with said casing and forming the source of supply for said pump, a branched conduit system connecting said pump with a plurality of bearings having different lubrication requirements, power operated means coordinated with said pump to regulate the supply of oil to said conduit system, a fibrous textile strainer in each branch of said conduit system, and metallic metering means of predetermined diverse ratings in the branches of said conduit system to apportion the lubricant supplied to the bearings according to their individual requirements.

22. In a centralized lubricating system of the class described, the combination of a lubricant reservoir, means including a pump supplied therefrom, a branched conduit system connecting said means with bearings requiring lubrication, a flow resistance in the conduit branches, and a power operated variable speed transmission for selectively driving said means at different speeds.

23. In a centralized lubricating system for the chassis bearings of an automobile, a lubricant reservoir, means including a pump supplied therefrom, a branched conduit connecting said means with the chassis bearings, flow resistances in the branches of said conduit and adjacent said bearings, check valves in said branches, mechanism for driving said means at either of two different speeds, said mechanism deriving its energy from the engine of the automobile, and manually operative means for selecting either speed of operation for said first named means.

24. A lubricating system for machine bearings, comprising a lubricant reservoir, a conduit having branches, each branch being connected to a bearing to be lubricated, means including a flow resistance and a valve located in each branch, and machine driven mechanism for intermittently injecting small quantities of lubricant corresponding to the exact needs of the bearings into said conduit whereby pressure is produced in said conduit, said means functioning to apportion accurately the quantity of lubricant delivered from each branch to its bearing in predetermined relative quantities depending upon the requirements of the individual bearings irrespective of their several resistances, and to maintain said conduit substantially filled with lubricant between pump injections thereinto.

SYLVANUS D. LOCKE.
CHARLES R. DOSCH.